(12) United States Patent
Yao

(10) Patent No.: US 8,790,541 B2
(45) Date of Patent: Jul. 29, 2014

(54) METHOD FOR PREPARING FLUORINATED NANODIAMOND LIQUID DISPERSION

(75) Inventor: Akifumi Yao, Ube (JP)

(73) Assignee: Central Glass Co., Ltd., Yamaguchi (JP)

( * ) Notice: Subject to any disclaimer, the term of this patent is extended or adjusted under 35 U.S.C. 154(b) by 44 days.

(21) Appl. No.: 12/308,068

(22) PCT Filed: Jun. 5, 2007

(86) PCT No.: PCT/JP2007/061328
§ 371 (c)(1),
(2), (4) Date: Dec. 5, 2008

(87) PCT Pub. No.: WO2007/142213
PCT Pub. Date: Dec. 13, 2007

(65) Prior Publication Data
US 2009/0283718 A1    Nov. 19, 2009

(30) Foreign Application Priority Data

Jun. 5, 2006 (JP) ................................. 2006-156506
Jun. 1, 2007 (JP) ................................. 2007-146513

(51) Int. Cl.
*C09K 3/00* (2006.01)
*C09K 11/08* (2006.01)
*C09K 11/61* (2006.01)
*H01L 23/12* (2006.01)
*H01L 23/053* (2006.01)

(52) U.S. Cl.
USPC ............... 252/182.12; 252/301.4 H; 257/700; 257/E21.53

(58) Field of Classification Search
CPC ........... C09K 2208/00; C09K 2208/10; C09K 3/1409; C09K 3/1454
USPC ........ 252/301.4 H, 182.12; 257/700, E21.53; 117/94, 104; 977/773
See application file for complete search history.

(56) References Cited

U.S. PATENT DOCUMENTS

| 2002/0194789 A1 * | 12/2002 | Oshima .......................... 51/308 |
| 2004/0002438 A1 | 1/2004 | Hawkins et al. |
| 2005/0158549 A1 | 7/2005 | Khabashesku et al. |
| 2006/0269467 A1 * | 11/2006 | Khabashesku et al. ....... 423/446 |

FOREIGN PATENT DOCUMENTS

| CN | 1439451 | * | 9/2003 | ................ B01F 3/12 |
| EP | 0 445 292 | | 9/1989 | |
| JP | 61-261386 | * | 11/1986 | ............... C09K 3/14 |
| JP | 4-502930 A | | 5/1992 | |
| JP | 2004-339412 A | | 12/2004 | |
| JP | 2005-001983 A | | 1/2005 | |
| JP | 2005-097375 A | | 4/2005 | |
| JP | 2006-131845 A | | 5/2006 | |
| WO | WO 91/04311 A1 | | 4/1991 | |
| WO | WO0227320 A1 | * | 1/2002 | ............. C11D 17/00 |

OTHER PUBLICATIONS

Liu et al Chem Mater 2004 16 3924-3930.pdf.*
Engineering ToolBox Viscosity Converter {http://www.engineeringtoolbox.com/viscosity-converter-d_413.html} Web Date Taken as Mar. 15, 2006.*
CPP (Committee for Prevention and Precaution: Nanotechnologies, Nanoparticles: What Hazards—What Risks? Paris [France] May 2006 {http://www.developpement-durable.gouv.fr/IMG/pdf/CPP_NanotechnologiesNanoparticles.pdf}).*
Yamamoto et al. (Magnune vol. 1 No. 12 pp. 588-593 2006 SciFinderAbstract).*
USPTO Interpreter for JP 61-261386 Dec. 2, 2013—Lapping.*
Form PCT/ISA/210 (International Search Report) dated Aug. 28, 2007.
Form PCT/ISA/237 (Written Opinion of the International Searching Authority) dated Aug. 28, 2007.
Tatsumi Ohi et al., "Fluorination of Cluster Diamond", 26th Japanese Symposium on Fluorine Chemistry Koen Yoshishu, 2002, pp. 24-25.
Eiji Osawa, "Purification of Detonation Nanodiamond", Bulletin of the Abrasive GrainProcession Society of Japan, 2003, vol. 47, No. 8, pp. 414-417 (with English Abstract).
Kotaro Hanada, "Characterization of Cluster Diamond and Application to Solid-Lubricant", Bulletin of the Abrasive Grain-Procession Society of Japan, 2003, vol. 47, No. 8, pp. 422-425 (with English Abstract).
Akiko Yonemoto et al., "Fluorination of Cluster Diamond", The Collected Resumes of the 83rd Annual Spring Meeting of the Chemical Society of Japan, Mar. 2003, 1 page (with English Abstract).
H. Touhara et al., "Property Control of Carbon Nano-Materials by Fluorination", Third French-Japanese Seminar on Fluorine in Inorganic Chemistry and Electrochemistry, Apr. 23-25, 2003, pp. 73-76.
Yu Liu et al., "Functionalization of Nanoscale Diamond Powder: Fluoro-, Alkyl-, Amino-, and Amono Acid-Nanodiamond Derivatives", Chem. Mater., 2004, pp. 3924-3930, American Chemical Society.
Supplementary European Search Report mailed on May 2, 2013, in corresponding EP Patent Application No. 07744685.4-1354/2033935.
Chinese Official Action mailed Oct. 28, 2010, for corresponding Chinese Patent Application.

* cited by examiner

Primary Examiner — Patrick Ryan
Assistant Examiner — Aaron Greso
(74) Attorney, Agent, or Firm — Buchanan Ingersoll & Rooney PC

(57) ABSTRACT

The present invention herein provides a method for preparing a dispersion of fluorinated nanodiamond particles, which can be used in, for instance, an abrasive, a lubricant, and a heat-exchanging fluid medium, which is stable over a long period of time on the order of not less than 120 hours and which has a viscosity, as determined at 20° C., of not less than 3 cP. This dispersion can be prepared by blending fluorinated nanodiamond particles with a first liquid having a viscosity, as determined at 20° C., of not higher than 2.5 cP to thus form a suspension, classifying the suspension to give a classified suspension, and then blending the classified suspension with a second liquid having a viscosity value, as determined at 20° C., of not less than 4 cP.

5 Claims, No Drawings

METHOD FOR PREPARING FLUORINATED NANODIAMOND LIQUID DISPERSION

TECHNICAL FIELD

The present invention relates to a method for the preparation of a fluorinated nanodiamond (ND) particle liquid dispersion which is useful as a precision abrasive, a lubricant, a fluid medium for heat-exchange, or the like.

BACKGROUND ART

The diamond particles obtained through the explosive-bombardment method (the impact method) wherein an impact pressure is caused using an oxygen-deficient explosive compound such as trinitrotoluene (TNT) or hexogen (RDX) have an extremely small primary particle size of 3 to 20 nm and accordingly, it has been referred to as nanodiamond (ND). However, a non-graphitic or graphitic film is welded onto the surface of such ND fine particles and the ND particles presently prepared are those in the form of secondary and/or tertiary agglomerates whose particle size falls within the range of from 50 to 7500 nm. Accordingly, they are also referred to as cluster diamond (CD) particles (see, for instance, Non-patent Documents 1 and 2 specified later). It has been expected that the ND particles may be used in wide variety of fields such as abrasives, lubricants, heat-exchanging fluid mediums, composite materials with resins and/or metals, electronic materials such as low dielectric films and emitter materials, medical fields such as DNA-carriers, virus-capturing carriers or the like, in addition to the usual applied fields of the diamond particles, because of their nano-order particle size.

Thus, when using, on an industrial scale, the ND particles in the form of composite materials, the ND particles must be provided in the form of a dispersion in which fine ND particles having a particle size ranging from a few to several hundreds of nanometer are dispersed in a liquid. However, when handling the ND particles in the form of a dispersion or a solution in which the particles having a particle size on the order of nanometer are dispersed, the particles are quite susceptible of undergoing agglomeration among them as the particle size thereof is reduced to a smaller level and the particles thus agglomerated are liable to cause settling. For this reason, it would be quite difficult to obtain a stable dispersion. Regarding the ND particles, there have thus variously been investigated a variety of methods for stably dispersing the primary ND particles per se in a liquid medium through the treatment of CD particles in an ultrasonic homogenizer or a beads-mill wet pulverizer (see, for instance, Patent Documents 1 and 2, specified below). However, the dispersions prepared according to these methods are insufficient in the long term stability and the particles present therein again undergo agglomeration after drying the same. Therefore, these conventional techniques have never met the commercial needs.

On the other hand, there has been reported a method for the reaction of CD particles with a fluorine gas for the purpose of the disintegration of any secondary and tertiary aggregates of CD particles. For instance, CD particles are brought into contact with fluorine gas at a reaction temperature ranging from 300 to 500° C. and a fluorine gas pressure of 0.1 MPa, for a reaction time ranging from 5 to 10 days, to thus give fluorinated CD particles having an F/C molar ratio of about 0.2 (as determined by the XPS technique and the elemental analysis), while maintaining the desired diamond structure thereof (see Non-Patent Document 3 specified below). The result of the TEM observation indicates that this fluorination treatment would permit the partial disintegration of the CD particles whose secondary particle size is about 40 μm and that the resulting disintegrated CD particles have a particle size on the order of about 200 μm. Moreover, it has been confirmed that the frictional coefficient of the CD particle is significantly reduced as is evident from the rotary type friction test using a mixed powder thereof with polytetrafluoroetylene (PTFE) (see Non-Patent Document 4 specified below). In this respect, it has been reported that the non-graphitic carbon present in the surface of the ND particles is removed due to the reaction at a high temperature and that the surface energy is reduced through the formation of groups such as CF groups, $CF_2$ groups and/or $CF_3$ groups on the ND particle surface, as is evident from the TEM observation of the ND particles, which indicates the presence of a clear lattice pattern thereof (see, Non-Patent Document 5 specified later). Moreover, it has likewise been reported that fluorinated ND particles whose fluorine content range from 5 to 8.6% by mass (as determined by the EDX analysis) could be synthesized by the fluorination reaction of ND particles carried out at a reaction temperature of 150, 310, 410 or 470° C., at a flow rate ratio: $F_2/H_2$ of 3:1 and a reaction time of 48 hours and there has also been reported such a result that the resulting fluorinated ND particles are improved in their solubility in a polar solvent such as ethanol as compared with the starting ND particles (see Non-Patent Document 6 and Patent Document 3, specified below).

Patent Document 1: JP-A-2005-1983;
Patent Document 2: JP-A-2005-97375;
Patent Document 3: U.S. Patent Application No. 2005/0158549 A1;
Non-patent Document 1: OSAWA Eiji, Bulletin of the Abrasive Grain-Procession Society of Japan, 2003, 47: 414;
Non-patent Document 2: HANADA Kotaro, Bulletin of the Abrasive Grain-Procession Society of Japan, 2003, 47: 422;
Non-patent Document 3: OI Tatsumi, YONEMOTO Akiko, KAWASAKI Shinji, OKINO Fujio, HIGASHIBARA Hidekazu, The Collected Main Purports of the 26th Meeting on Fluorine Chemistry, held on 2002, November;
Non-patent Document 4: YONEMOTO Akiko, OI Tatsumi, KAWASAKI Shinji, OKINO Fujio, KATAOKA Fumiaki, OSAWA Eiji, HIGASHIBARA Hidekazu, The Collected Resumes of the 83rd Annual Spring Meeting of the Chemical Society of Japan, held on 2003, March;
Non-patent Document 5: H. Touhara, K. Komatsu, T. Ohi, A. Yonemoto, S. Kawasaki, F. Okino and H. Kataura: Third French-Japanese Seminar on Fluorine in Inorganic Chemistry and Electrochemistry (April, 2003); and
Non-patent Document 6: Y. Liu, Z. Gu, J. L. Margrave, and V. Khabashesku; Chem. Mater. 16, 3924 (2004).

DISCLOSURE OF THE INVENTION

Problems that the Invention is to Solve

ND particles and fluorinated ND particles can uniformly be dispersed in dispersion mediums, for instance, alcohols such as ethanol and isopropanol; acetone; and dimethylsulfoxide to thus prepare a dispersion containing the ND particles or the fluorinated ND particles in a high concentration. However, they cannot be dispersed, at all, in hydrocarbon mediums such as n-hexane, benzene and petroleum oils (generally, linear hydrocarbons each having not less than 6 carbon atoms) and they have an extremely low dispersibility in, for instance, alcohols having not less than 6 carbon atoms. Moreover, it has generally been known that the nanoparticles including ND particles and fluorinated ND particles cannot easily be dispersed in a highly viscous liquid uniformly and accordingly, it would be quite difficult to obtain a dispersion of such particles having a high dispersed particle concentration and a high viscosity. In case of the ND particles and fluorinated ND particles, there has scarcely been reported any dispersion in which the particles are dispersed in their primary ones and which has a viscosity of not less than 3 cP as determined at 20° C. Regarding the dispersions of the foregoing ND particles and fluorinated ND particles, which are to be used as the aforementioned abrasive and lubricants, the dispersion mediums should satisfy the requirements for the physicochemical properties thereof such as the viscosity, volatility, flammability and electrical conductivity, depending on the applications of the resulting dispersions, but only a few kinds of dispersion mediums permit the dispersion of such particles and therefore, the choice thereof is limited to an extremely narrow range.

As has been discussed above, fluorinated nanodiamond (fluorinated ND) particles cannot be dispersed in only a part of the dispersion mediums and, in particular, they are quite difficulty dispersed in mediums having a viscosity of not less than 3 cP as determined at 20° C., among others and accordingly, such dispersions can be used in considerably limited fields of applications.

Accordingly, it is an object of the present invention to provide a fluorinated nanodiamond (fluorinated ND) particle dispersion which is stable over a long period of time on the order of not less than 120 hours and which has a viscosity, as determined at 20° C., of not less than 3 cP.

Means for the Solution of the Problems

The inventor of this invention has conducted intensive studies to achieve the foregoing object, has found that a dispersion which is stable over a long period of time on the order of not less than 120 hours can be prepared using fluorinated ND particles as the dispersed particles and a combination of liquids having viscosity values, as determined at 20° C., of not higher than 2.5 cP and not less than 4 cP, respectively, and has thus completed the present invention.

Accordingly, the present invention relates to a method for preparing a dispersion of fluorinated nanodiamond particles, comprising the steps:

(1) preparing a suspension by blending fluorinated nanodiamond particles with a first liquid having a viscosity value, as determined at 20° C., of not higher than 2.5 cP;

(2) classifying the suspension to give a classified suspension; and (3) blending the classified suspension with a second liquid having a viscosity value, as determined at 20° C., of not less than 4 cP.

Effects of the Invention

According to the present invention, the dispersion medium can appropriately be selected in consideration of each particular application of the resulting dispersion. In addition, the fluorinated ND dispersion prepared according to the present invention has a viscosity, as determined at 20° C., of not less than 3 cP and can stably maintain its dispersed state over a long period of time on the order of not less than 120 hours.

BEST MODE FOR CARRYING OUT THE INVENTION

The present invention will now be described in more detail below.

In the step (1) of the method according to the present invention, fluorinated nanodiamond (or fluorinated ND) particles are blended with a first liquid having a viscosity value, as determined at 20° C., of not higher than 2 cP to thus form a suspension.

The fluorinated ND particles herein used are those prepared by modifying the surface of ND particles by, for instance, the direct reaction of ND particles with fluorine gas or the fluorination of ND particles using fluorine plasma. It is suitable that the fluorine content of the resulting fluorinated ND particles in general ranges from 10 to 15% by mass and preferably 11 to 13% by mass.

In addition, the first liquid used is suitably a liquid having a viscosity, as determined at 20° C., ranging, for instance, from 0.1 to 2.5 cP and preferably 0.3 to 2.5 cP. Specific examples of such first liquids suitably used herein include methanol (0.6 cP), ethanol (1.2 cP), isopropyl alcohol (2.3 cP) and acetone (0.3 cP). In this respect, the viscosity used in the present invention is one determined using a rotational viscometer.

The suspension can be prepared by, for instance, dispersing the fluorinated ND particles in the first liquid while applying ultrasonic waves. The ultrasonic waves can suitably be applied to the blend of these two components using, for instance, an ultrasonic homogenizer (VCX-750 available from Sonics & Materials Co., Ltd.).

The concentration of the fluorinated ND particles in the resulting suspension suitably falls within the range of, for instance, from 1 to 7% by mass and preferably 1 to 5% by mass.

When allowing the suspension to stand for a period of time, fluorinated ND particles having a large particle size begin to separate out of the suspension and the suspension is thus divided into a supernatant and a precipitated particle phase. However, if such a suspension in which the ND particles are maintained in a suspended state through the stirring treatment such as an ultrasonic wave-application is subjected to a classification treatment as will be described below, a suspension of fluorinated ND particles as quite fine particles can be obtained as a supernatant obtained after the classification. The fluorinated ND particles can be incorporated into the first liquid even in an amount of greater than 7% by mass, but the use of such a high concentration exceeding 7% by mass is not preferred since the resulting suspension becomes a clayey one, it undergoes gelation and/or it has a high viscosity and, as a result, it is quite difficult to carry out the classification of the suspension. On the other hand, the use of fluorinated ND particles in a concentration of less than 1% by mass is not likewise preferred, because the concentration of the fine particulate fluorinated ND component present in the supernatant obtained is reduced after the classification.

To obtain a dispersion having a dispersed particle concentration of not less than 1% by mass, the power of the ultrasonic waves to be used is, for instance, not less than 400 W and preferably not less than 700 W (suitably, the maximum level thereof is, for instance, 1,500 W); and it is sufficient that the sonication time is reduced as the power (W) thereof increases. For instance, when the power of the ultrasonic waves used is 400 W, the sonication time is not less than 0.5 hour and preferably not less then one hour (satisfactorily, the maximum level thereof is, for instance, 2 hours); when the power is 700 W, the sonication time is not less than 0.3 hour and preferably not less than 0.5 hour (satisfactorily, the maximum level thereof is, for instance, one hour); and when using ultrasonic waves having a power of 1,500 W, the sonication time is not less than 0.1 hour and preferably not less than 0.3 hour (satisfactorily, the maximum level thereof is, for instance, 0.5 hour). If the power of the ultrasonic waves used is less than 400 W or the sonication time is less than 0.5 hour, or if the dispersion of the ND particles is carried out by stirring with, for instance, a stirrer without using any ultrasonic application, the fluorinated ND particles is insufficiently dispersed in the first liquid and therefore, it would be difficult to obtain a desired dispersion having a dispersed particle concentration of not less than 1% by mass.

In the step (2), the resulting suspension is subjected to a classification treatment. The classification can be carried out by, for instance, the centrifugation technique. The centrifugation can suitably be performed using a device such as a centrifuge (CN-2060 available from HSIANGTA Company).

The centrifugation permits the removal of impurities and agglomerated particles having a particle size of greater than 500 nm and hence the preparation of a transparent dispersion comprising fluorinated ND particles having an average particle size ranging, for instance, from 10 to 500 nm and preferably 10 to 300 nm. In this connection, if the average particle size of the fluorinated ND particles present in the resulting dispersion exceeds 500 nm, the dispersion has a tendency to cause the formation of precipitates and to reduce the storage stability and the stability during using the same. In this respect, the particle size used herein is one determined according to the dynamic light scattering technique.

To obtain a classified suspension in which the dispersed fluorinated ND particles have an average particle size falling within the range of from 10 to 300 nm, the centrifugal force is, for instance, not less than 1800 G, and preferably not less than 3000 G (the maximum level thereof would be, for instance, on the order of 6000 G). Regarding the centrifugation time, the greater the centrifugal force, the shorter the centrifugation time. For instance, it is preferred that, when the centrifugal force is set at a level of 1800 G, the centrifugation time is, for instance, not less than one hour and preferably not less than 1.5 hour (the maximum level thereof would be on the order of about 3 hours), that, if the centrifugal force is set at a level of 3000 G, the centrifugation time is, for instance, not less than 0.5 hour and preferably not less than one hour (the maximum level thereof would be on the order of about 2 hours) and that, if the force is set at 6000 G, the required time is, for instance, not less than 0.1 hour and preferably not less than 0.5 hour (the maximum level thereof would be on the order of about one hour). When the relative centrifugal force is less than 1800 G or the centrifugation time is less than 0.5 hour, fluorinated ND particles having a particle size of greater than 500 nm cannot completely be removed and accordingly, it would be difficult to obtain any desired excellent dispersion. In addition, there has also been known another classification method such as the filtration technique which makes use of a filter, but this technique removes even fine particles having a particle size of not more than 500 nm and accordingly, this technique does not permit the preparation of any dispersion whose dispersed particle concentration is not less than 0.5% by mass.

It is preferred that the dispersed particle concentration in the resulting classified suspension, for instance, ranges from 0.1 to 5% by mass and preferably 0.5 to 3% by mass. If the dispersed particle concentration is less than 0.5% by mass, the amount of the secondary liquid to be added to the suspension is limited in the subsequent step for the incorporation of the secondary liquid as will be described below and accordingly, it would be difficult to obtain a dispersion having a desired sufficient viscosity. On the other hand, if the dispersed particle concentration exceeds 5% by mass, the resulting dispersion has such a tendency that it may undergo the formation of precipitates and that it also suffers from the reduction of the storage stability and the stability during using the same.

In the foregoing step (3), the resulting classified dispersion is blended with a secondary liquid having a viscosity, as determined at 20° C., of not less than 4 cP.

In the present invention, it is desirable that the secondary liquid used is a liquid having a viscosity, as determined at 20° C., ranging, for instance, from 4 to 1,500 cP and particularly preferably 4 to 1,000 cP. Specific examples of such secondary liquids suitably used herein include alcohols having 6 to 12 carbon atoms (6 to 20 cP) such as octanol (12 cP) and decanol (15 cP); glycerin (940 cP); paraffins (10 to 1,500 cP); mineral spirits (about 4 to 10 cP); hydrocarbon oils; fluorides of alcohols or fluorinated alcohols such as tetrafluoro-propanol (TFP: $C_3H_4F_4O$) (5 cP) and octafluoropentanol (OFP: $C_5H_4F_8O$) (12 cP); and polymers of trifluorochloro-ethylene having an average molecular weight ranging from 500 to 1,000 (PCTFE) (5 to 1,500 cP).

In this connection, the viscosity appearing in the description of the present invention is one determined using a rotational viscometer.

The amount of the secondary liquid to be blended with the classified suspension may vary depending on the kind of the secondary liquid selected, but it is preferably selected in such a manner that the dispersion obtained after the blending has a viscosity, as determined at 20° C., of not less than about 3 cP and preferably not more than about 500 cP and that the dispersed particle concentration of the dispersion is not less than 0.05% by mass and preferably not less than 0.1% by mass (the upper limit thereof is, for instance, 5% by mass). Moreover, the average particle size of the dispersed particles ranges, for instance, from 10 to 500 nm and preferably 10 to 300 nm.

The method for blending the classified suspension with the secondary liquid is not restricted to any particular one and the blending thereof may be carried out simply by blending these two components together. If necessary, ultrasonic waves may be applied to the mixture thereof, as in the foregoing step (1).

The fluorinated ND particle dispersion whose viscosity, as determined at 20° C., is less than 3 cP permits the direct dispersion of fluorinated ND particles and as a result, it can provide a dispersion having a dispersed particle concentration of higher than 0.05% by mass. This accordingly makes it difficult to achieve the intended effects of the present invention.

In this respect, the use of, for instance, a concentration of ND particles dispersed in the resulting dispersion of less than 0.05% by mass is not preferred since only a small number of fluorinated ND particles are present in the dispersion, and this in turn results in the achievement of only an insufficient effect when applied to, for instance, abrasives. On the other hand, when preparing a dispersion by adding fluorinated ND particles to a dispersion medium obtained by blending a first liquid and a second liquid in such a manner that the resulting mixed medium has a viscosity, as determined at 20° C., of not less than 3 cP, mixing them while applying ultrasonic waves thereto and then subjecting the mixture to a classification treatment through the centrifugation, the fluorinated ND particles are never uniformly dispersed in such a mixed medium and accordingly, these procedures never provide any dispersion in which the dispersed particles have an average particle size of not more than 300 nm.

The present invention will be described in more detail below with reference to the following Examples.

EXAMPLES

Examples 1 to 7

ND particles (purified nanodiamond powder having a particle size ranging from 3 to 10 nm, manufactured by the Limited Responsibility Company: Kanshuku Ryoun-Nomai Materials; Selling Agent: New Metals and Chemicals Corporation) were preliminarily heated to a temperature of 400° C. for 3 hours under a pressure of 1 kPa to thus remove any moisture included therein. To a reaction tube of nickel, there was added 20 g of the dried ND particles and then fluorine gas and argon gas were passed, at a temperature of 20° C., through the particles in the tube at flow rates of 20 mL/min and 380 mL/min, respectively. Then, the sample was heated to 400° C. and the passage of fluorine gas and argon gas was further continued for 140 hours to thus make them react with one another and to thus prepare fluorinated ND particles. In this respect, the fluorine content of the resulting fluorinated ND particles was found to be 12% by mass as determined by the elemental analysis thereof.

To 500 g of ethanol (viscosity: 1.2 cP, Examples 1 to 5) or isopropyl alcohol (viscosity: 2.4 cP, Examples 6 and 7) as a liquid having a viscosity, as determined at 20° C., of not more than 2.5 cP, there was added 6.2 g of the resulting fluorinated ND particles and the mixture was them subjected to an ultrasonic wave-application for 0.5 hour using an ultrasonic homogenizer (VCX-750 available from Sonics & Materials Co., Ltd.) at a power of 400 W to thus form a suspension containing the fluorinated ND particles dispersed therein. In both of the suspensions prepared using ethanol and isopropyl alcohol, all of the fluorinated ND particles added thereto were found to be uniformly dispersed in the suspensions obtained at this stage, the suspensions were free of any precipitate and the dispersed particle concentrations of the suspensions were found to be 1.2% by mass.

Then, each of the resulting suspensions was classified for one hour using a centrifuge (CN-2060 available from HSIANGTA Company) at a rotational frequency of 4300 rpm (relative centrifugal acceleration of 2000 G) and the supernatant obtained after the centrifugation was recovered to thus give a dispersion. The resulting dispersion was inspected for the average particle size, the viscosity and the dispersed particle concentration and as a result, the dispersions prepared using ethanol (Examples 1 to 5) were found to have an average particle size of 102 nm, a viscosity of 1.2 cP and a dispersed particle concentration of 0.8% by mass, while the dispersions prepared using isopropyl alcohol (Examples 6 and 7) were found to have an average particle size of 122 nm, a viscosity of 2.3 cP and a dispersed particle concentration of 1.1% by mass.

To 100 g of the resulting dispersion, there was added 200 g of 1-octanol (viscosity: 12.5 cP; Example 1) as a liquid having a viscosity, as determined at 20° C., of not less than 4 cP, then the resulting mixture was stirred to give a dispersion, the dispersion was allowed to stand over 120 hours and the dispersion was then inspected for the average particle size, the viscosity and the dispersed particle concentration.

The determination of the foregoing average particle size was carried out by determining the mass-converted particle size distribution using a particle size distribution determining device (FPAR1000 available from OTSUKA Electronics Company) based on the dynamic light scattering technique to thus calculate the average particle size of the dispersion; the viscosity thereof was measured at 20° C. using a rotational viscometer (TVC-5 available from TOKI-SANGYO K.K.) at a rotational frequency of 20 rpm; and the dispersed particle concentration was calculated by weighing out 10 g of the dispersion, followed by drying the dispersion in a dryer at 50° C. to thus remove the dispersion medium and determining the mass of the remaining particles to thus give the desired dispersed particle concentration.

The same procedures used above were repeated using, as the liquid having a viscosity, as determined at 20° C., of not less than 4 cP, CTFE oil (DAIFLOYL #1 available from Daikin Industries, Ltd.; viscosity: 20 cP; Example 2), glycerin (viscosity: 940 cP; Examples 3, 4 and 7), and mineral spirit (CAS No. 64742-47-8; viscosity: 4.2 cP; Examples 5 and 6). In this respect, the glycerin was used in an amount of 200 g (Examples 3 and 7) or 400 g (Example 4).

The results thus obtained are summarized in the following Table 1, respectively.

TABLE 1

| Ex. No. | Liquid having a viscosity of not more than 2.5 cP at 20° C. | Liquid having a viscosity of not less than 4 cP at 20° C. | Viscosity of Dispersion; cP | Dispersed particle concn. of Fluorinated ND % by wt. | Average particle size; nm |
|---|---|---|---|---|---|
| 1 | Ethanol | 1-Octanol | 6 | 0.26 | 140 |
| 2 | | CTFE Oil | 12 | 0.14 | 151 |
| 3 | | Glycerin | 120 | 0.19 | 144 |
| 4 | | Glycerin | 280 | 0.09 | 148 |
| 5 | | Mineral Spirit | 3.5 | 0.30 | 118 |
| 6 | Isopropyl Alcohol | Mineral Spirit | 4.2 | 0.42 | 123 |
| 7 | | Glycerin | 150 | 0.36 | 182 |

Comparative Examples 1 to 3

To 1.2 g of fluorinated ND particles prepared by repeating the same procedures used in Examples 1 to 7, there were added 100 g each of 1-octanol (Comp. Ex. 1), CTFE oil (Comp. Ex. 2), and glycerin (Comp. Ex. 3), the resulting mixtures were blended through the ultrasonic wave-application and then classified under the same conditions used in Examples 1 to 7 to give each corresponding supernatant, followed by allowing these supernatants to stand over 120 hours and the subsequent determination of the average particle sizes thereof according to the same method used in Examples 1 to 7.

As a result, the average particle sizes were found to be 952 nm for the dispersion in 1-octanol and 3800 nm for the dispersion in glycerin. In case where the dispersion medium used was CTFE oil, the particles in the dispersion obtained after the ultrasonic wave-application underwent the formation of precipitates within 0.1 hour from the ultrasonic application, any desired suspension could not be prepared. After further subjecting the dispersion to additional centrifugation to obtain a supernatant, the dispersed particle concentration in the supernatant was determined according to the same method used in Examples 1 to 7, but the presence of any particle in the liquid could not be detected at all.

Comparative Examples 4 and 5

In these comparative examples, the dispersed particles used were fluorinated ND particles prepared by repeating the same procedures used in Examples 1 to 7 and the dispersion media herein used were a 1:2 (ratio by volume) ethanol/1-octanol mixed medium (Comp. Ex. 4) and a 1:2 (ratio by volume) ethanol/glycerin mixed medium (Comp. Ex. 5). According to the same method used in Comparative Examples 1 to 3, to 100 g of each dispersion medium, there was added 1.2 g of the fluorinated ND particles, followed by the blending through the ultrasonic wave-application and the classification according to the centrifugation to obtain each corresponding supernatant, according to the same methods used in Comparative Examples 1 to 3. Then, each supernatant thus obtained was allowed to stand over 120 hours and it was inspected for the average particle size by the same method used in Examples 1 to 7. As a result, the average particle sizes were found to be 751 nm for the dispersion in the ethanol/1-octanol mixed medium and 1264 nm for the dispersion in the ethanol/glycerin mixed medium.

INDUSTRIAL APPLICABILITY

The dispersion of fluorinated ND particles prepared according to the method of the present invention can be used in a wide variety of fields such as abrasives, lubricants, heat-exchanging fluid mediums, resins, composite materials with metals, electronic materials such as low dielectric films, emitter materials, medical fields such as DNA-carriers, virus-capturing carriers or the like, in addition to the usual applied fields of the diamond.

What is claimed is:

1. A method for preparing a dispersion of fluorinated nanodiamond particles, comprising the steps:
    (1) preparing a suspension by blending fluorinated nanodiamond particles with a first liquid, wherein said first liquid is methanol, ethanol, isopropyl alcohol, or acetone;
    (2) removing impurities and agglomerated particles having a particle size of greater than 500 nm from said suspension to give a classified suspension comprising fluorinated nanodiamond particles having an average particle size ranging from 10 to 300 nm; and
    (3) blending the classified suspension with a second liquid having a viscosity value, as determined at 20° C., of not less than 4 cP,
    wherein said dispersion comprises fluorinated nanodiamond particles having an average particle size ranging from 10 nm to 300 nm.

2. The method of claim 1, wherein said second liquid is selected from the group consisting of hydrocarbons, alcohols, glycerin, fluorinated derivatives of alcohols, polymers of tri-fluoro-chloro-ethylene and mixtures thereof.

3. A dispersion of fluorinated nanodiamond particles prepared according to the method of claim 2.

4. A dispersion of fluorinated nanodiamond particles prepared according to the method of claim 1.

5. The method of claim 1, claim 2, or claim 4, wherein said dispersion has a stability such that the dispersed fluorinated nanodiamond particles in the dispersion have an average particle size of from 10 to 300 nm after standing for 120 hours.

* * * * *